United States Patent [19]

Nishimura et al.

[11] Patent Number: 4,685,766

[45] Date of Patent: Aug. 11, 1987

[54] OPTICAL DEVICE

[75] Inventors: Yukuo Nishimura, Sagamihara; Eigo Kawakami, Kawasaki; Toshiaki Asano, Yokohama; Masahiro Haruta, Funabashi; Hiroshi Takagi, Yokohama; Takashi Noma, Tokyo; Nobutoshi Mizusawa, Yokohama; Mitsunobu Nakazawa; Kunitaka Ozawa, both of Tokyo, all of Japan

[73] Assignee: Canon Kabushiki Kaisha, Tokyo, Japan

[21] Appl. No.: 570,814

[22] Filed: Jan. 16, 1984

[30] Foreign Application Priority Data

| Jan. 22, 1983 | [JP] | Japan | 58-8868 |
| Jan. 22, 1983 | [JP] | Japan | 58-8869 |
| Jan. 22, 1983 | [JP] | Japan | 58-8870 |
| Jan. 22, 1983 | [JP] | Japan | 58-8871 |
| Jan. 22, 1983 | [JP] | Japan | 58-8872 |

[51] Int. Cl.[4] .................................. G02B 6/20
[52] U.S. Cl. ........................ 350/96.32; 350/96.10; 350/96.34; 350/363; 362/32
[58] Field of Search .............. 350/96.29, 96.30, 96.32, 350/341, 363, 96.10; 362/32

[56] References Cited

U.S. PATENT DOCUMENTS

| 3,612,653 | 10/1971 | Rajchman | 350/363 |
| 3,641,332 | 2/1972 | Reick et al. | 350/96.32 X |
| 3,782,914 | 1/1974 | Luca et al. | 350/96.30 X |
| 3,894,788 | 7/1975 | Gambling et al. | 350/96.32 |
| 4,195,907 | 4/1980 | Zamja et al. | 350/96.10 X |

FOREIGN PATENT DOCUMENTS

| 2246724 | 4/1973 | Fed. Rep. of Germany | 350/96.32 |
| 0158302 | 12/1981 | Japan | 350/96.32 |
| 0168604 | 12/1981 | Japan | 350/96.32 |
| 1558404 | 1/1980 | United Kingdom | 350/96.32 |

Primary Examiner—William L. Sikes
Assistant Examiner—Akm E. Ullah
Attorney, Agent, or Firm—Fitzpatrick, Cella, Harper & Scinto

[57] ABSTRACT

An optical device comprises an optical waveguide constituted of as a basic unit a core layer of a material having a relatively high refractive index and a clad layer of a material having a relatively low refractive index and covering said core layer, and heating means for heating said core layer to change the refractive index thereof, characterized in that when said core layer is constituted of a liquid, said core layer is heated by said heating means to a temperature such that said core layer does not boil.

10 Claims, 15 Drawing Figures

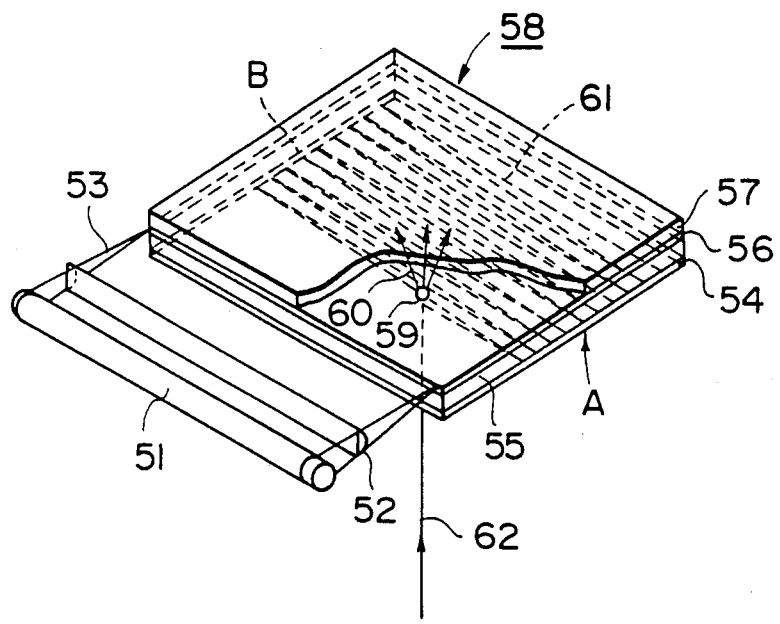
F I G. 11
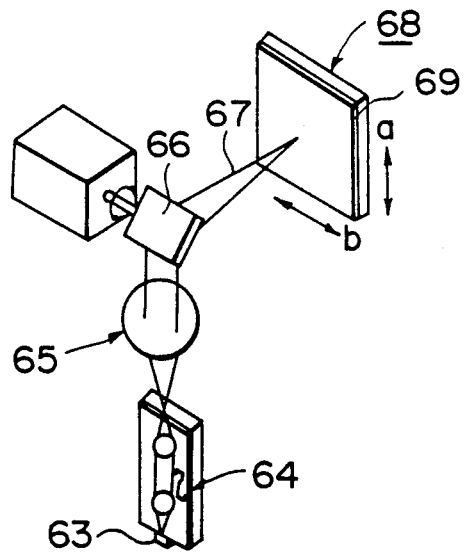
F I G. 12

OPTICAL DEVICE

BACKGROUND OF THE INVENTION

1. Field of the Invention

The present invention relates to a novel optical device and, more particularly, to an optical device adapted for light modulation or display, to an optical apparatus using the same, and to a method for operating the same.

2. Description of the Prior Art

Cathode-ray tubes (CRTs) are widely used as displays for office equipment or measuring equipment, or as displays for television or VTR monitors. However, such CRTs still have problems of low image quality, low resolution, and small display capacity as compared to those of a hard copy produced by silver salt or by electrophotography.

As a substitute for a CRT, a liquid crystal panel which has a liquid crystal in a dot matrix format is known as a display. However, a liquid crystal display which satisfies the requirements of drivability, display performance, reliability, productivity, and durability has not yet been devised. An optical shutter utilizing a liquid crystal light bulb is receiving attention as an optical modulator.

Such a device is disadvantageous in that a complex and expensive optical system is required.

SUMMARY OF THE INVENTION

It is an object of the present invention to provide an optical device which is free from the problems of the prior art optical devices and which realizes a simple light modulation apparatus or display apparatus without requiring a complex and expensive optical system; and also to provide an optical apparatus using the same and a method of operating the same.

It is another object of the present invention to provide an optical device which has excellent drivability, reliability, productivity, durability, and so on by using a simple and inexpensive optical system; and also to provide an optical apparatus using the same and a method of operating the same.

It is still another object of the present invention to provide an optical device which allows formation of an image of good quality and high resolution, an optical apparatus using the same, and a method of operating the same.

According to one aspect of the present invention an optical device comprises an optical waveguide constituted of as a basic unit a core layer of a material having a relatively high refractive index and a clad layer of a material having a relatively low refractive index and covering said core layer, and heating means for heating said core layer to change the refractive index thereof, characterized in that when said core layer is constituted of a liquid, said core layer is heated by said heating means to a temperature such that said core layer does not boil.

According to another aspect of the present invention an optical device comprises an optical waveguide panel constituted of a plurality of cylindrical optical waveguides each comprising as a basic unit a core layer of a material having a relatively high refractive index and a clad layer of a material having a relatively low refractive index and covering said core layer, and heating means for heating predetermined ones of said cylindrical optical waveguides, characterized in that when said core layer is constituted of a liquid, said core layer is heated by said heating means to a temperature such that said core layer does not boil.

According to a further aspect of the present invention an optical device comprises an optical waveguide panel having optical waveguide channels with core layers formed therein by filling a transparent liquid having a relatively high refractive index in parallel channels formed in a combined clad layer of a relatively low refractive index by adhering a transparent flat clad layer having stripe-shaped grooves on a surface therein and a flat clad layer, and heating means for heating said core layer so as to change the refractive index of said core layer, characterized in that when said core layer is constituted of a liquid, said core layer is heated by said heating means to a temperature such that said core layer does not boil.

According to a still further aspect of the present invention an optical apparatus comprises an optical device which is constituted of an optical waveguide constituted of as a basic unit a core layer of a material having a relatively high refractive index and a clad layer of a material having a relatively low refractive index and covering said core layer, and heating means for heating such that the refractive index of at least said core layer between said core layer and said clad layer is changed; and a light source for supplying light to said optical waveguide, characterized in that when said core layer is constituted of a liquid, said core layer is heated by said heating means to a temperature such that said core layer does not boil.

BRIEF DESCRIPTION OF THE DRAWINGS

FIG. 11 is a schematic perspective view of a display apparatus as an application of the present invention;

FIG. 12 is a schematic perspective view showing the configuration of a two-dimensional scanning mechanism used in the display apparatus shown in FIG. 11;

DETAILED DESCRIPTION OF THE PREFERRED EMBODIMENTS

The preferred embodiments of the present invention will now be described with reference to the accompanying drawings.

FIGS. 1 to 4 are views for explaining the basic principles of an optical device according to the present invention.

Figure 1:
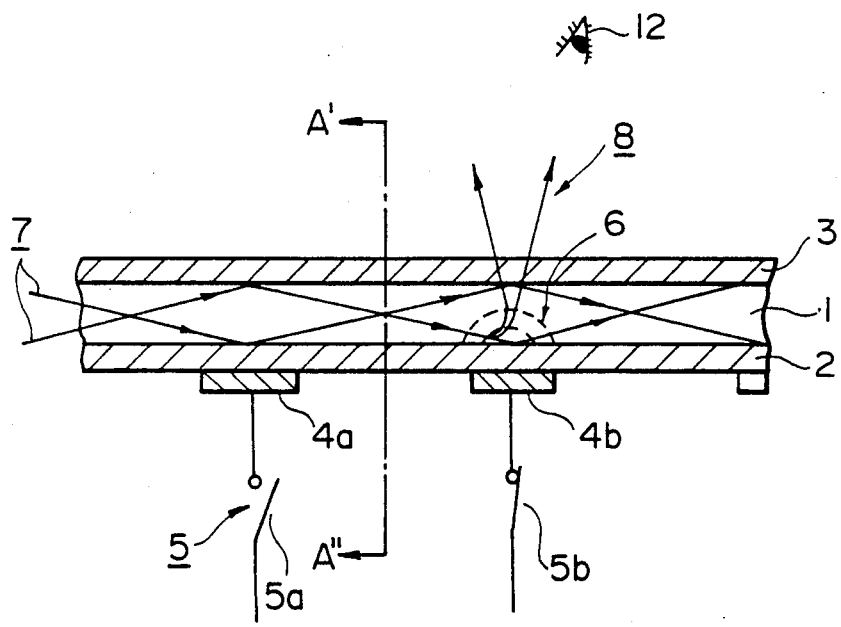
FIG. 1 is a schematic sectional view for explaining the principle of operation of an optical device according to the present invention as a light modulation device or a display device.
Figure 2A:
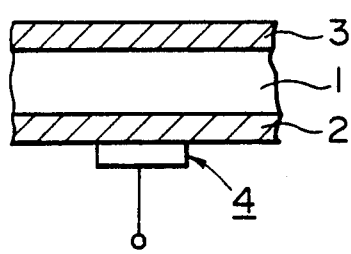
FIGS. 2A and 2B are schematic cross-sectional views of the optical device shown in FIG. 1.

FIG. 1 is a partial, schematic longitudinal sectional view of an optical device according to the present invention, and FIG. 2A is a partial, schematic cross-sectional view of the optical device shown in FIG. 1 along the line A'—A". Referring to FIG. 1 and FIG. 2A, a core layer 1 comprises a material having a relatively high refractive index compared with that of clad layers 2 and 3, and partially constitutes an optical waveguide to serve similarly to a core of an optical fiber. The core material of an optical fiber generally comprises a transparent glass or plastic. However, the core layer 1 of the optical device according to the present invention is not limited to such a solid material. Rather, in some cases, it is preferable, as will be described later, to provide a core layer 1 of a liquid or a fluid. The core layer 1 preferably has a thickness of 1 $\mu$m to 1 mm. Clad layers 2 and 3 correspond to the clad layer of an optical fiber, and vertically sandwich the core layer 1 therebetween. The clad layers 2 and 3 respectively comprise a transparent material (solid, liquid or gas) having a relatively low refractive index compared with that of the core layer 1, so as to allow propagation of light through the core layer 1 utilizing the total reflection effect at the interfaces between the core layer 1 and the clad layers 2 and 3. Such a transparent material may comprise a glass or plastic having a low refractive index. Note that the clad layer 2 can be non-transparent. A heating device 4 for partially heating the core layer 1 (if the core layer 1 comprises a liquid material, the core layer 1 must only be heated to a temperature such that the core layer material does not boil) is arranged at least one of the clad layers 2 and 3. In the case of this embodiment under discussion, the heating means 4 is arranged outside and in contact with the clad layer 2.

The heating means may be arranged outside and closely the clad layer 2. The heating means is arranged in a point-like, island-like, dotted-line or dot matrix format over the entire outer surface of the clad layer 2.

In the case of this embodiment, as shown in FIGS. 1 and 2A, as the heating means 4, resistance materials for heating (to be referred to as heating resistors hereinafter) 4$a$, 4$b$, and so on are arranged in a dotted-line format on the clad layer 2. Each heating resistor has one end connected to ground and the other end connected to a corresponding electrode (not shown). Each of switches 5 (5$a$, 5$b$, and so on) has one end commonly receiving a power source voltage and the other end connected to the electrode (not shown) connected to the corresponding heating resistor 4$a$, 4$b$, or the like. Upon heating, a heated region 6 is formed in the core layer 1. When the switch 5$b$ is turned on to supply power to the heating resistor 4$b$ and the generated heat is supplied to the core layer 1 through the clad layer 2, the region 6 is heated to a relatively high temperature, at which it has a different refractive index from that of the rest of the core layer 1. Incident or input light 7 within the visible light range is incident on the core layer 1 and propagates therethrough. Output light 8 is produced from the core layer 1 through the clad layer 3 and is observed by an observer 12.

The basic operation principle of the optical device of the present invention based on light modulation principle and display principle will now be described with reference to FIGS. 1 and 2A. When the light 7 becomes incident upon one end of the core layer 1 which has a relatively high refractive index and which is covered with the clad layers 2 and 3 under the condition that the core layer 1 is not heated and hence has a uniform refractive index distribution, the light 7 is totally reflected at the interface between the core layer 1 and the clad layer 2 or the clad layer 3. Thus, the light 7 propagates through the core layer 1 by repeated total reflection at these interfaces to the output end (the opposite end to the incident end), as may be apparent from the principle of an optical fiber (which may also be referred to as a cylindrical optical waveguide) or a thin film optical waveguide. If leakage of the light 7 occurs, a small amount of light as the output light 8 may reach the eyes of an observer 12 through the clad layer 3. However, in practice, the light 7 hardly reaches the observer 12.

The switch 5$b$ is turned on, as shown in FIG. 1, in order to charge with electricity the heating resistor 4$b$ among other heating resistors 4$a$, 4$b$ and so on, arranged in the dotted-line format. Then, part of the clad layer 2 and part of the core layer 1 near the heating resistor 4$b$ are heated to form the heated region 6 in the core layer 1. If a material which experiences a negative change in refractive index with respect to a change in temperature, that is, a material which experiences a reduction in its refractive index with an increase in temperature, is selected as the core layer 1, a thermal gradient index region is formed as the heated region 6 of the heated core layer 1 (if the core layer 1 is a liquid, it must be heated without being boiled). Then, of the light 7, the path of the light which reaches the heated region 6 is disturbed, and the conditions for total reflection as described above are disturbed. Accordingly, at least part of the light which reaches the heated region 6 propagates no further through the core layer 1 but passes through the clad layer 3 to be produced outside the optical device as the output light 8. Then, the observer 12 has the impression that this light 8 is produced from the heating resistor 4$b$. If an optical sensor is arranged in place of the observer, it detects the light 8.

If the heating resistors 4$a$, 4$b$ and so on are formed in small point-like shapes, small heated regions 6 are formed when the heating resistors 4$a$, 4$b$ and so on are charged with electricity to generate heat. The small heated regions 6 disturb the path of the light 7, such that part of the light 7 is produced as the output light 8 from the optical device. Thus, the observer 12 perceives as if the heating resistors 4$a$, 4$b$ and so on are emitting light in point form. On the other hand, if the heating resistors 4$a$, 4$b$ and so on having other shapes are used, the observer 12 perceives as if such shapes are displayed.

If small heating resistors are arranged in a dot matrix format, a desired character or pattern can be displayed with a set of dots corresponding to the heated regions for observation by the observer when desired heating resistors are charged with electricity. This embodiment is described with reference to a case wherein a change in refractive index of the core layer 1 with a change in temperature is significantly greater than that of the clad layers (for example, when a core layer is constituted of a liquid and clad layers are constituted of a solid material). Accordingly, since almost no influence is hardly experienced from the heated region formed in the clad layer 2, such a heated region is not described.

The greater the change in refractive index of a material with a change in temperature, the greater the change in the refractive index of a resultant heated region with a smaller change in temperature. Thus, the path of the incident light is greatly disturbed by the small heated region in the core layer to provide an improved display effect. When the change in temperature of the heated region formed in the core layer is represented by $\Delta T$ and the change in refractive index is represented by $\Delta N$, the ratio of the change in temperature to that in the refractive index, that is, $|\Delta N/\Delta T|$, is largest in the order of a liquid, a solid and a gas. Accordingly, a transparent liquid is an optimal material for the core layer 1.

The basic component of a transparent liquid as the material of the core layer 1 may be selected from water, various types of organic solvents, and mixtures thereof. Examples of organic solvents may include an alkyl alcohol such as methyl alcohol, ethyl alcohol, n-propyl alcohol, isopropyl alcohol, n-butyl alcohol, sec-butyl alcohol, tert-butyl alcohol, isobutyl alcohol, pentyl alcohol, hexyl alcohol, heptyl alcohol, octyl alcohol, nonyl alcohol, or decyl alcohol; a hydrocarbon-type solvent such as hexane, octane, cyclopentane, benzene, toluene, or xylene; a halogenated hydrocarbon-type solvent such as carbon tetrachloride, trichloroethylene, tetrachloroethylene, tetrachloroethane, or dichlorobenzene; an ether-type solvent such as ethyl ether, butyl ether, ethylene glycol diethyl ether, or ethylene glycol monoethyl ether; a ketone-type solvent such as acetone, methyl ethyl ketone, methyl propyl ketone, methyl amyl ketone, or cyclohexanone; an ester-type solvent such as ethyl formate, methyl acetate, propyl acetate, phenyl acetate, or ethylene glycol monoethyl ether acetate; an alcohol-type solvent such as diacetone alcohol; an amide such dimethylformamide or dimethylacetamide; an amine such as triethanolamine or diethanolamine; a polyalkylene glycol such as polyethylene glycol or polypropylene glycol; an alkylene glycol such as ethylene glycol, propylene glycol, butylene glycol, or hexylene glycol; a polyhydric alcohol such as glycerin; and a petroleum hydrocarbon-type solvent.

The refractive index of the transparent liquid as the material of the core layer 1 must be higher than that of the clad layers 2 and 3. Since the refractive index of the clad layers 2 and 3 is usually 1.5 or less, examples of a liquid of the core layer 1 satisfying such a refractive index requirement are enumerated below.

| Refractive Index | Liquid for Core Layer |
| --- | --- |
| 1.500 | Butyl iodide, Chloro-1-bromo-ethylene, Diethyl-isoprene-dicarboxylate Ethoxy-methylene-cyclohexane-2-one (1) |
| 1.501 | Benzene, Butyl-isothiocyanate, Dimethyl-1-dichloromethylcyclohex-3-ene(1, 4), dimethyl-3-ethyl-pyrazine(2, 5) |
| 1.502 | Ethyl-1-allyl-5-methyl-pyrazol-5-carboxylate, Ethyl-dibromoacetate, Ethyl-5-methyltetrahydro-indazole(1), Ethylsorbate |
| 1.503 | Cedrene, Diethyl-benzene, Diethyl-phthalate, 1,2-Dimethyl-4-ethyl-benzene |
| 1.504 | Benzoic acid, Dihydro-camphoryl-chloride, 1,3-Dimethyl-4-ethylbenzene, |

-continued

| Refractive Index | Liquid for Core Layer |
| --- | --- |
| 1.5043 | 1,4-Dimethyl-2-ethylbenzene |
| 1.505 | Dicyclopentadiene, Dimethylbenzene |
| 1.506 | Dibromohexane, Diethyl-disulfide |
| 1.507 | Dibromo-butane(1,3), p-Isobutylanisate |
| 1.508 | Diamyl-cyanamide, Dibromo-pentane (2, 3) |
| 1.509 | Dibromo-2-methylpropane |
| 1.510 | Ethoxy-O—xylene |
| 1.5107 | 1,3-Dimethyl-2-ethylbenzene |
| 1.511 | Dibromo-hexane |
| 1.512 | Dimethyl-3-ethylbenzene(1,2) |
| 1.513 | Dibromo-ethane(1, 1), Dimethyl-amino-O—xylene |
| 1.514 | Chloro-maleoyl chloride, Butyro-O—cresyl-acetate |
| 1.515 | Dibromo-pentane(1, 5) |
| 1.516 | Dihydroxy-naphthalene |
| 1.517 | Diethylstyrene |
| 1.518 | p-Ethoxyl-allyl-phenol |
| 1.519 | Dimethyl-4-bromopyrazole |
| 1.520 | Dimethyl-amino-O—xylene(4) |
| 1.521 | Ethyl-$\alpha,\beta$-dimethyl-cinnamate |
| 1.522 | Chloro-fumaroyl-chloride |
| 1.523 | Chlorotoluene |
| 1.524 | 1,3-Dimethyl-4-allyl-5-anisol |
| 1.525 | Dibromopropane(1,3) |
| 1.526 | Ethyl-atropate |
| 1.527 | p-Dichlorobenzene |
| 1.528 | Dibromo-1,1,4-trimethyl-cyclohexane (3, 4) |
| 1.529 | Benzyltrichloroacetate |
| 1.530 | Ethoxystyrene |
| 1.531 | Dimethylphenylcarbinol |
| 1.532 | Fluoro-nitrobenzene |
| 1.533 | Dimethyl-m-tolyl-ketone |
| 1.534 | 1,3-Dimethyl-5-phenyl-cyclohex-3-ene(1,3) |
| 1.535 | Creosol(3, 1, 4) |
| 1.536 | Ethyl-$\beta$-chloro-$\alpha$-acrylate |
| 1.537 | Diethyl-dithiocarbonate |
| 1.538 | Ethyl-phenyl-carbamate |
| 1.539 | Butyro-anisole |
| 1.540 | Diallylphenol |
| 1.541 | Dimethyl-acetonylacetone |
| 1.542 | Methoxystyrene |
| 1.543 | 91 Homocatechol |
| 1.544 | Ethyl-tribromo-acetate |
| 1.545 | Ethyl-allocinnamate |
| 1.546 | Ethyl-methyl-cinnamate |
| 1.547 | Iodomethyl-methyl-ether |
| 1.548 | Benzalacetone-dipropyl-ketone |
| 1.549 | Benzyl-3,5-dimethyl-pyrazole(1) |
| 1.550 | Dibromo-propane-2-ol(1, 3) |
| 1.551 | Dimethyl-chromene($\alpha$) |
| 1.552 | Dichlorobenzene(0) |
| 1.553 | Chloro-1,3-dimethyl-4-benzene(5) |
| 1.554 | Ethyl-hydrindone($\beta$) |
| 1.555 | 6-Methyl-chromanone |
| 1.556 | Ethyl-aniline |
| 1.557 | Ethyl-phenylproprionate |
| 1.558 | Ethyl-$\beta$-benzylamino-acetoacetate |
| 1.559 | Iodo-propane-1-ol(3) |
| 1.560 | Hydroxyacetophenone(p) |
| 1.561 | Propyl-indazole |
| 1.562 | Nitro-anisole(0) |
| 1.563 | Phenyl-3-hydroxy-pento-1-ene(1) |
| 1.564 | Triazobenzene |
| 1.565 | Dimethyl-1-keto-1,2,3,4-tetra-hydronaphthalene |
| 1.566 | Phenyl-1-p-tolyl-ethane |
| 1.567 | Propyl-styryl-ketone(iso) |
| 1.568 | Phenyl-tetrahydro-indazole(1) |
| 1.569 | Phthalyl-dichloride |
| 1.570 | Methylaniline |
| 1.571 | Ethyl-2-ethylindazole-3-carboxylate |
| 1.572 | Methyl-$\alpha$-methyl-O—methoxycinnamate |
| 1.573 | 1-Phenyl-3-hydroxy-1-butylene |
| 1.574 | Phenyl-2,4-dimethyl-pyrazole(1) |
| 1.575 | Dimethyl-5-phenyl-cyclohexa-3,5-diene(1, 3) |
| 1.576 | Nitro-p-cresol |

-continued

| Refractive Index | Liquid for Core Layer |
|---|---|
| 1.577 | Nitroso-methylaniline |
| 1.578 | Propenyl-p-cresol |
| 1.579 | Phenyl-β-methylstyrene(α) |
| 1.580 | 3-Methyl-5-chloro-pyrazole(1) |
| 1.581 | Methyl-2-ethylindazole |
| 1.582 | Phenyl-5-methylpyrazole |
| 1.583 | Phenylether |
| 1.584 | Propionyl-acetophenone |
| 1.585 | Methyl-2-methoxybenzoylacetone |
| 1.586 | Thiophenol |
| 1.587 | Phenylnitromethane-methylether |
| 1.588 | Ethyl-1-methoxy-2-naphthoate |
| 1.589 | Phenyl-cyclohexane |
| 1.590 | Triphenyl-methane |
| 1.591 | Methyl-O—benzoylbenzoate |
| 1.592 | Methyl-2,4-diethylnaphthalene |
| 1.593 | Tetrahydro-quinoline(1,2,3,4) |
| 1.594 | Ethyl-naphthoate |
| 1.595 | Ethyl-α-methyl-β-naphthoate |
| 1.596 | Phenyl-pyrazole |
| 1.597 | Fluoro-1,1,1,2-tetrabromo-ethane |
| 1.598 | Iodo-p-xylene |
| 1.599 | Tribromo-ethylene |
| 1.600 | Tribromo-propane |
| 1.601 | Methyl-2-ethylnaphthalene |
| 1.602 | Ethyl-methylcinnamylidene-acetate |
| 1.603 | Methylnaphthalene(β) |
| 1.604 | 4-iode-O—xylene |
| 1.605 | Ethoxy-thionaphthene |
| 1.606 | Methyl-6-methyl-1-naphthoate |
| 1.607 | 3-iode-O—xylene |
| 1.608 | Phenylpropiolic aldehyde |
| 1.609 | Phenylstyrene(α) |
| 1.610 | Titanium tetrachloride |
| 1.612 | Methyl-4-ethyl-2-acetyl-naphalene(1) |
| 1.613 | Phenyl-buta-1,3-diene(1) |
| 1.614 | Cinnamoyl chloride |
| 1.615 | Diphenyl-ketene |
| 1.616 | Dimethylnaphthalene(1,2) |
| 1.617 | Methylquinoline(3) |
| 1.618 | Methylnaphthalene(α) |
| 1.619 | Methyldiphenylamine(N) |
| 1.620 | Ethyl-4-acetylnaphthalene(1) |
| 1.621 | Toluquinoxaline |
| 1.622 | Isoquinoline |
| 1.623 | Quinoxaline |
| 1.624 | Methylacetate-8-acetylnaphthalene |
| 1.626 | Methylacetate-O—aminophenyl sulfide |
| 1.627 | Methylacetate-2-acetylnaphthalene |
| 1.628 | Methoxy-thionaphthene |
| 1.630 | Naphthonitrile |
| 1.632 | Methyl-O—bromophenyl sulfide |
| 1.633 | Thionaphthene |
| 1.634 | Phenylenediamine |
| 1.635 | Diphenyl sulfide |
| 1.636 | Methylstilbene |
| 1.638 | Tetrabromoethane(1,1,2,2) |
| 1.644 | Dimethylaminonaphthalene |
| 1.646 | Methyl-naphth-1-aldehyde(4) |
| 1.647 | Cyano-tetrabromide |
| 1.648 | Ethyl-aminonaphthalene(α) |
| 1.649 | Naphthylamine(β) |
| 1.653 | Methoxy-naphth-1-aldehyde(4) |
| 1.654 | Ethyl-aminonaphthalene(β) |
| 1.655 | Naphthaldehyde(α) |
| 1.657 | Phenanthrene |
| 1.658 | Bromonaphthalene(α) |
| 1.664 | Azoxybenzene |
| 1.666 | Sulfur monochloride |
| 1.670 | Naphthylamine(α) |
| 1.676 | Ethylanthracene |
| 1.680 | Methylanthracene |
| 1.683 | Naphthylenediamine |
| 1.693 | Tellurium diphenyl |
| 1.696 | Methylanthracene |
| 1.697 | Phosphorus bromide |
| 1.706 | Acetylene diiodide |
| 1.708 | Naphthylenediamine |
| 1.736 | Sulfur bromide |
| 1.743 | Methylene iodide |

-continued

| Refractive Index | Liquid for Core Layer |
|---|---|
| 1.885 | Hydrogen disulfide |

The above list includes only examples, and the liquid of the core layer according to the present invention is not limited to those materials enumerated above.

Figure 3:
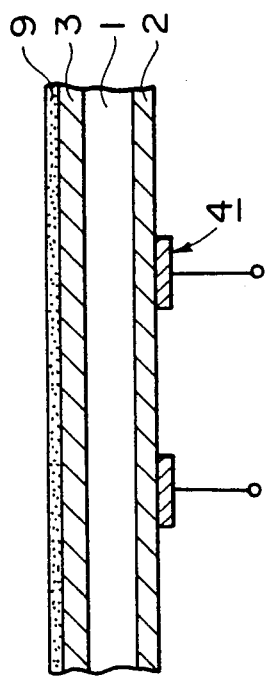
FIG. 3 is a schematic sectional view of an optical device in which a light diffusion layer is formed on the optical device shown in FIG. 1.

FIG. 3 shows a schematic sectional view of an optical device according to the present invention, wherein a light diffusion layer 9 is formed directly on the clad layer 3 of the optical device shown in FIG. 1.

Referring to FIGS. 1 and 2A, at least part of the incident light 7, which part is deflected from its path by the heated region 6 and passed through the clad layer 3 as the output light 8, can be observed. However, this output light 8 has a slight directivity depending upon the form of the heated region 6, so that the angle of the field in which this output light 8 can be perceived is limited. Accordingly, when the light diffusion layer 9 is formed on the clad layer 3 as shown in FIG. 3, light passed through the clad layer 3 is diffused through the light diffusion layer 9, so that the angle of the field in which the diffused light can be observed is widened. This matter is desirable for the observer.

Figure 2B:
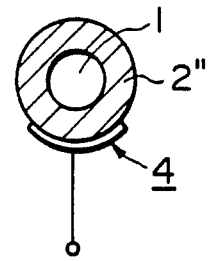

The section of the core layer 1 and the clad layers 2 and 3 of the optical device shown in FIG. 1 taken along the line A'—A" therein is shown to be rectangular in FIG. 2A. However, the core layer 1 may have a circular section as shown in FIG. 2B. In this case, the clad layers 2 and 3 are formed integrally with each other and are shown as a single tubular clad layer 2" (to be called a tubular optical waveguide). Thus, the core layer 1 and the clad layers 2 and 3 generally have a rectangular or circular section but are not limited thereto according to the present invention.

Figure 4:
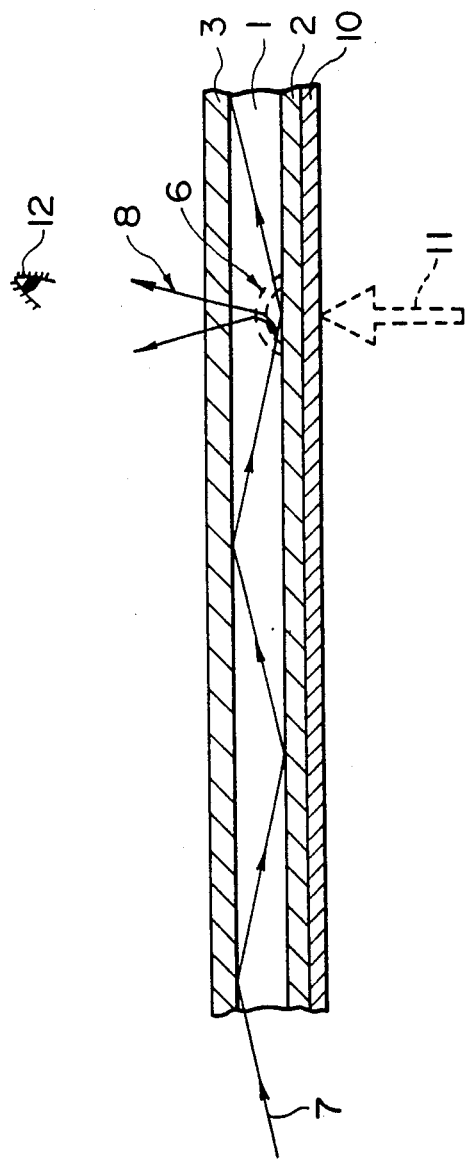
FIG. 4 is a schematic sectional view for explaining another principle of operation of an optical device according to the present invention as a light modulation device or display device.

FIG. 4 is a partial schematic longitudinal sectional view showing the basic configuration of an optical device according to another embodiment of the present invention, which uses an infrared ray absorption layer as a heating means.

Referring to FIG. 4, a core layer 1 is constituted of a liquid (although it may be constituted of either a liquid or solid). Clad layers 2 and 3 cover the respective surfaces of the core layer 1. Incident light 7 becomes incident upon one end of the core layer 1 and propagates therethrough. Output light 8 is produced outside the device through the clad layer 3. An observer 12 observes the output light 8. The refractive index of material of the core layer 1 is significantly higher than that of materials of the clad layers 2 and 3 which are described with reference to FIG. 1. An infrared ray absorption layer 10 as a heating means is formed on the entire outer surface of the clad layer 2. When the core layer 1 is heated, a heated region 6 is formed in the core layer 1 in the following manner. When infrared rays 11 are irradiated onto the infrared ray absorption layer 10, the irradiated portion of the infrared ray absorption layer 10 generates heat. The heat in the infrared ray absorption layer 10 is conducted to part of the core layer 1, and locally heats the core layer 1 without reaching the boiling point thereof. Thus, the heated region 6 is formed to have a relatively high temperature.

Referring to FIG. 4, the basic operation principle of the optical device according to this embodiment based on light modulation principle and display principle will now be described.

When the infrared ray absorption layer 10 is not irradiated with the infrared rays 11 and, therefore, the core layer 1 is not heated and has a uniform refractive index distribution, the light 7 incident upon one end of the core layer 1 propagates through the core layer 1 by repeated total reflection at the interfaces between the core layer 1 and the clad layers 2 and 3. In this condition, no part of the light 7 reaches the observer 12 through the clad layer 3. Therefore, even if the observer 12 views the optical device, he cannot perceive any light.

When the infrared ray absorption layer 10 is irradiated with the infrared rays 11 as in the figure, the irradiated portion of the layer 10 generates heat. The thus generated heat is conducted to the core layer 1 through the clad layer 2 and locally heats the core layer 1 without reaching the boiling point thereof. Thus, the heated region 6 having a refractive index different from the rest of the core layer 1 is formed in the core layer 1. When a material having a negative change in refractive index with a change in temperature is selected as the material of the core layer 1, the heated region 6 becomes a thermal gradient index region. As a result of this, the path of the portion of the light 7 which has reached the heated region 6 is disturbed; total reflection between the core layer and the clad layer 3 is disturbed. Then, at least part of the light does not continue to propagate through the core layer 1 but is produced as the output light 8 outside the optical device through the clad layer 3. The output light 8 is then viewed by the observer 12. The observer 12 has the impression that the output light 8 is produced from the heated portion of the infrared ray absorption layer 10. If a light sensor is arranged in place of the observer 12, it can detect light when the output light 8 becomes incident upon the light-receiving surface of the light sensor.

The heated region 6 formed in the core layer 1 of the optical device having the configuration shown in FIGS. 1 to 4 disappears when the supply of heat thereto is stopped and when it is cooled (by natural cooling or forced cooling). When the heated region 6 disappears, the light 7 which has reached the portion of the core layer 1, in which the heated region 6 has been formed, is totally reflected at the interface between the core layer 1 and the clad layer 2 and propagates through the core layer 1. In the optical device of the embodiment shown in FIGS. 1 to 4, the heating means need not be arranged outside the clad layer 2. However, as long as the objects of the present invention are achieved, the heating means may be arranged within the clad layer or immediately below the core layer, or in combination thereof. This also applies to the case of a mirror to be described below.

The clad layer 2 of the optical device having the configuration as shown in FIGS. 1 to 4 may be replaced by a mirror which is obtained by forming a light-reflecting metal film on a substrate. However, in this case, the mirror surface must be arranged to be in contact with or near the core layer 1.

Figure 5:
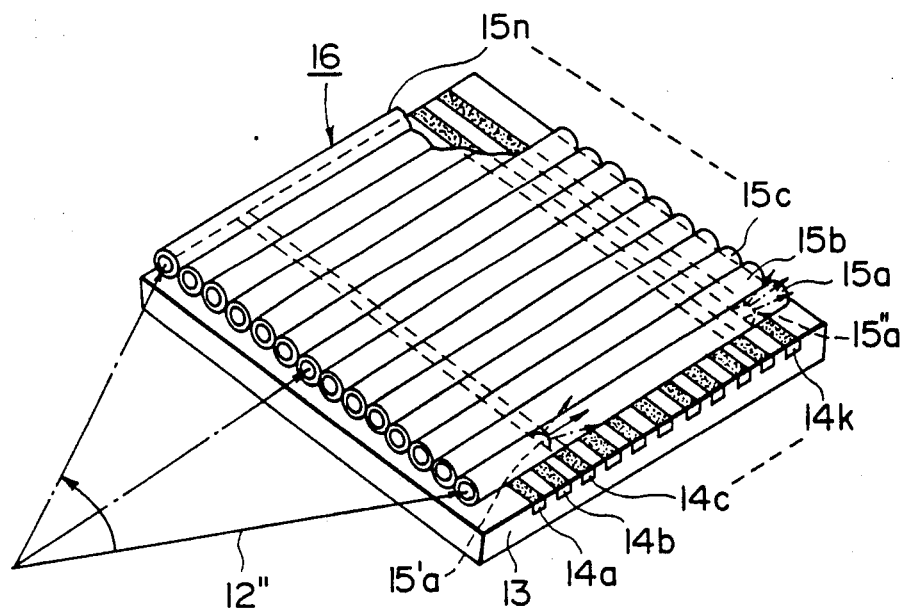
FIGS. 5 to 7 are schematic perspective views showing the configuration of a light modulation apparatus or a display apparatus as an application of the present invention.

FIG. 5 is a partially exploded schematic perspective view of an embodiment of a light modulation apparatus or a display apparatus which adopts the light modulation principle of the optical waveguide shown in FIGS. 1 and 2B. Referring to FIG. 5, resistance materials for heating 14a, 14b, 14c, ..., 14k (hereinafter referred to as heating resistors 14) are formed in a stripe format in a substrate 13. An optical waveguide panel is arranged on the heating resistors 14. The optical waveguide panel is obtained by arranging next to each other a number of cylindrical optical waveguides 15a, 15b, 15c, ..., 15n (hereinafter referred to as optical waveguide 15) each having a core layer and a clad layer of longitudinal and cross sections as shown in FIGS. 1 and 2B. The optical waveguides 15 have their longitudinal axes perpendicular to those of the heating resistors 14. A laser beam 12" having a wavelength falling within the visible light range is repeatedly scanned in the direction indicated by the arrow and becomes sequentially incident upon the core layers of the respective optical waveguides 15. A light modulation device or display device 16 comprises the parts as described above except the laser beam 12". Heated regions 15'a and 15"a are formed in the core layer of the optical waveguide 15a upon heating thereof (without being boiled in the case where it is a liquid). The heated regions formed in the core layers of the other optical waveguides are omitted for the sake of simplicity.

When none of the heating resistors 14 is charged with electricity, the core layers of the respective optical waveguides 15 are not heated. Accordingly, no heated regions as that shown in FIG. 1 are formed in the core layers of the optical waveguides 15. The laser beam 12" which becomes incident upon one end of the core layer of a selected optical waveguide among the optical waveguides 15 propagates through the selected optical waveguide and is produced therefrom by repeated total reflection at the interface between the core layer and the clad layer.

When only the heating resistors 14c and 14k are charged with electricity and the laser beam 12" becomes incident upon the optical waveguides 15, heated regions (the heated regions 15'a and 15"a for the optical waveguide 15a) are formed in the core layers of the respective optical waveguides 15 crossing the heating resistors 14c and 14k. Meanwhile, the laser beam 12" incident upon one end of the optical waveguide 15a is disturbed in its path by the heated regions 15'a and 15"a, as described with reference to FIG. 1, and a part of the disturbed light is produced as display light (output light) outside the display device 16 through the clad layer of the optical waveguide 15a, as indicated by the arrows.

Then, a suitable number of heating resistors 14 are charged with electricity and heated so that the laser beam 12" becomes incident upon one end of the optical waveguide 15b for display thereby. This is sequentially repeated for the optical waveguides 15c to 15n so as to provide a two-dimensional display using the display device 16 as one frame. The heated regions previously formed in the core layers of the optical waveguides, that is, the heated regions formed in the optical waveguides other than the optical waveguide 15a and formed simultaneously with the heated regions 15'a and 15"a of the optical waveguide 15a, e.g., the heated regions formed in the optical waveguide 15b, are cooled (naturally or forcibly cooled) before the laser beam 12 becomes incident upon one end of the optical waveguide 15b for the next display. Thus, the next display by the optical waveguide 15b may not be disturbed by the previous display. When it is desired to display the points corresponding to the heating resistors 14c and 14k during the next display by the optical waveguide 15b, the heating resistors 14c and 14k need only be charged with electricity again. If the optical waveguide 15b is not required for the display, the heating resistors 14c and 14k are not charged with electricity.

Figure 6:
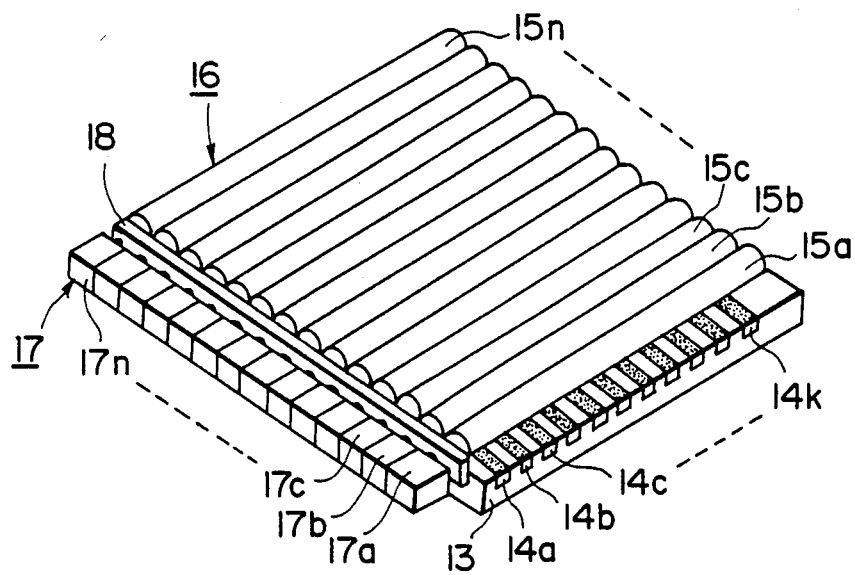

FIG. 6 is a schematic perspective view of a light modulation apparatus or a display apparatus wherein a light source comprising a light-emitting diode array is attached to the display device shown in FIG. 5.

Referring to FIG. 6, heating resistors 14 (14a, 14b, ..., 14k) of the light modulation apparatus or display apparatus are formed in a substrate 13. An optical waveguide panel is arranged on the heating resistors 14. The optical waveguide panel has cylindrical optical waveguides 15 (15a, 15b, ..., 15n), each of which has a core layer and a clad layer, and which are arranged next to each other and perpendicularly to the heating resistors 14. A flat microlens array 18 is arranged at the incident side of the optical waveguides 15 such that light fluxes emitted from a light-emitting diode array 17 comprising light-emitting diodes 17a, 17b, ..., 17n are effectively supplied to the corresponding optical waveguides 15. The flat microlens array 18 may be omitted. Note that the light-emitting diodes 17a, 17b, 7c, ..., 17n and the optical waveguides 15a, 15b, 15c, ..., 15n have a one-to-one correspondence.

The mode of display operation in the case of the apparatus shown in FIG. 6 remains the same as that of FIG. 5. A suitable number of heating resistors 14 are charged with electricity, and heated regions are formed in the core layers of those optical waveguides 15 which cross the heated resistors 14. At the same time, the corresponding light-emitting diodes emit light which becomes incident upon the optical waveguides which are to perform display. Then, these optical waveguides perform the desired display in accordance with the display principle described with reference to FIGS. 1 and 5. When the light-emitting diodes 17a, 17b, 17c, ..., 17n of the light-emitting diode array 17 are sequentially scanned, the light modulation device 16 provides a two-dimensional display as one frame. In the apparatus shown in FIG. 6, the heating resistors can be sequentially charged with electricity and a desired number of light-emitting diodes can be energized in synchronism with a heating signal to achieve a similar display.

Figure 7:
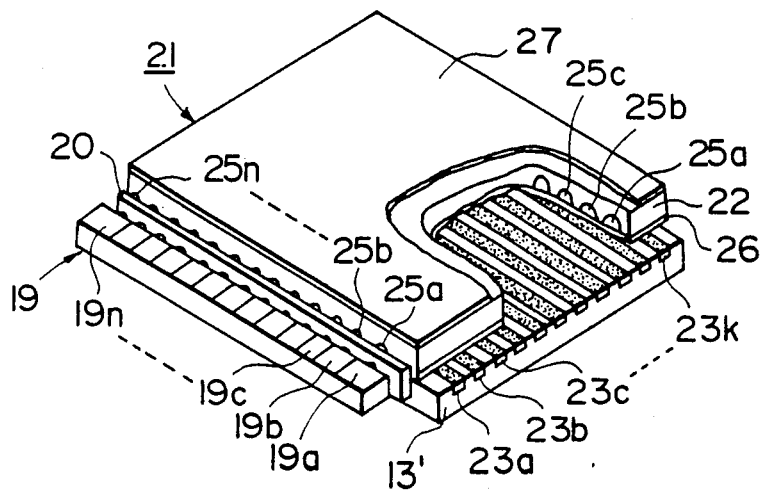

FIG. 7 is a partially exploded schematic perspective view of another embodiment of modulation apparatus or a display apparatus which utilizes the light modulation principle of the optical device shown in FIG. 1.

Referring to FIG. 7, a transparent clad layer 22 comprises a flat member having a relatively low refractive index and a number of grooves formed therein in a stripe format. Another clad layer 26 also comprises a member having a relatively low refractive index and is formed integrally by thermal fusion or the like with the surface of the clad layer 22 on which the grooves are formed. Thus, the grooves of the clad layer 22 become elongated channels when the clad layers 22 and 26 are adhered together in this manner. A liquid having a relatively high refractive index and serving as a core layer is filled in these channels. Thus, a number of parallel optical waveguide channels 25a, 25b, 25c, ..., 25n (hereinafter referred to as optical waveguide channels 25) are formed. The clad layers 22 and 26 and the optical waveguide channels 25 constitute an optical waveguide panel. A number of resistance materials for heating 23a, 23b, 23c, ..., 23k (hereinafter referred to as heating resistors 23) are formed in a stripe format on a substrate 13'. Note that the optical waveguide channels 25 are formed perpendicularly to the heating resistors 23. According to another effective method for preparing such an optical waveguide panel as described above, a dielectric having a low refractive index such as $SiO_2$ is coated on the heating resistors 23 arranged on the substrate 13' to form the clad layer 26. Thereafter, the substrate 13' and the clad layer 22 with grooves are adhered to each other. A light diffusion layer 27 is formed on the clad layer 22. The upper surface of the clad layer 22 is formed to have small indentations to provide the light diffusion layer 27. Each of optical waveguide channels 25 has a similar longitudinal section to that shown in FIG. 3. A light modulation device or a display device 21 comprises all these parts as described above.

A light-emitting diode array 19 consisting of light-emitting diodes 19a, 19b, 19c, ..., 19n is arranged at the incident side of the optical waveguide channels 25 through a flat microlens array 20.

The display or light modulation operation of the apparatus shown in FIG. 7 remains the same as that described with reference to FIG. 5 or 6. More specifically, of the heating resistors 23, selected heating resistors are charged with electricity, and parts of the core layers of the optical waveguide channels 25 crossing these selected heating resistors are heated to form heated regions as described with reference to FIG. 1. Selected light-emitting diodes of the light-emitting diode array 19 emit light which becomes incident upon the core layers of the corresponding optical waveguide channels. Then, the path of the light which has propagated by repeated total reflection at the interfaces between each core layer and the corresponding clad layer and which has reached the heated region is disturbed. At least part of the light whose path is disturbed in this manner is passed through the clad layer 22 and is diffused by the light diffusion layer 27 to be produced from the display device 21 as display light. In this manner, suitable heating resistors 23 are charged with electricity and the corresponding diodes 19a, 19b, 19c, ..., 19n of the light-emitting diode array 19 are energized in synchronism therewith for point display. This operation is repeated to provide a two-dimensional display as one frame from the display device 21. The heated regions formed in the core layers of the selected optical waveguide channels can be cooled before the next scanning operation, so that the subsequent display is not disturbed.

In the apparatus having the configuration shown in FIGS. 5 to 7, the density of the heating resistors attainable in practice is 8 to 16 resistors/mm, the attainable density of the optical waveguides is 8 to 20 optical waveguides/mm, and the attainable density of the optical waveguide channels is 8 to 16 optical waveguide channels/mm.

Figure 8:
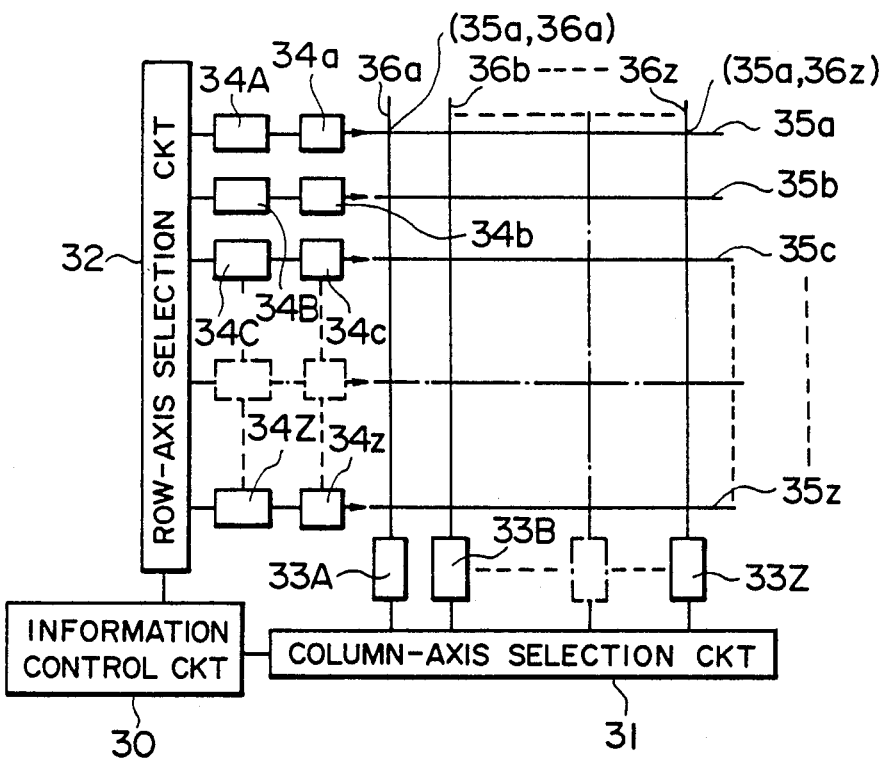
FIG. 8 is a block diagram of a display apparatus as an application of the present invention.

FIG. 8 is a block diagram of a light modulation apparatus or a display apparatus as an application of the present invention.

Referring to FIG. 8, the respective constituents of each light modulation device or display device of the apparatus having the configuration as shown in FIGS. 6 and 7 will be described in detail with reference to a case wherein the light modulation devices or display devices are driven in a matrix format. A row-axis selection circuit 32 is electrically coupled to row-axis driver circuits 34A, 34B, 34C, ..., 34Z through signal lines. The row-axis driver circuit 34A is connected to a light-emitting diode 34a of a light-emitting diode array 34 (34a, 34b, 34c, ..., 34z), and the row-axis driver circuit 34B is connected to the light-emitting diode 34b. Similarly, the row-axis driver circuit 34C is connected to the light-emitting diode 34c, and so on. Finally, the row-axis driver 34Z is connected to the light-emitting diode 34z. A column-axis selection circuit 31, column-axis driver circuits 33A, 33B, . . . , 33Z, and heating resistors 36a, 36b, . . . , 36z are connected in a similar manner. An information control circuit 30 is electrically coupled to the row-axis selection circuit 32 and the column-axis selection circuit 31 through signal lines. Optical waveguides 35a, 35b, 35c, . . . , 35z have, for example, the same configuration as that described in FIGS. 1 to 3 and are arranged in correspondence with the light-emitting diodes 34a, 34b, 34c, . . . , 34z. The information control circuit 30 produces an information control instruction so as to instruct the row-axis selection circuit 32 as to which one of the optical waveguides 35a, 35b, 35c, . . . , 35z as row-axes is to be selected. The information control circuit 30 also supplies a similar instruction to the column-axis selection circuit 31 as to which one of the heating resistors 36a, 36b, . . . , 36z as column-axes is to be selected.

The light-emitting diodes 34a, 34b, 34c, . . . , 34z correspond to the light-emitting diodes shown in FIGS. 6 and 7. The optical waveguides 35a, 35b, 35c, . . . , 35z correspond to the optical waveguides or optical waveguide channels shown in FIGS. 6 and 7. The heating resistors 36a, 36b, . . . , 36z correspond to those shown in FIGS. 6 and 7.

The method of driving the light modulation apparatus or display apparatus shown in FIGS. 6 and 7 will be described with reference to FIG. 8. When the row-axis driver 34A is selected by the instruction from the information control circuit 30, the row-axis driver 34A is charged with electricity for a predetermined period of time. During this predetermined period of time, the light-emitting diode 34a emits light. The light emitted from the light-emitting diode 34a is guided to the optical waveguide 35a. When the row-axis driver 34B is selected next, the light-emitting diode 34b emits light similarly, and the light is guided to the optical waveguide 35b. In this manner, the light is scanned in the line sequence in correspondence with the optical waveguides 35a, 35b, . . . , 35z. When a video signal as one of information control signals from the information control circuit 30 is supplied to the column-axis selection circuit 31, the column-axis selection circuit 31 selects a heating resistor as a predetermined column-axis. When the column-axis selection circuit 31 selects, for example, the heating resistors 36a and 36z, the column-axis driver circuits 33A and 33Z energize the heating resistors 36a and 36z in response to 33A and 33Z column selection signals from the column-axis selection circuit 31. Then, the parts of the core layers of the optical waveguides 35a, 35b, 35c, . . . , 35z which cross the heating resistors 36a and 36z are heated without being boiled, and the heated regions are formed. When the heating resistors 36a and 36z are turned off by off-signal, the heated regions are cooled and return to the original state. If the selection of the row-axis, that is, the optical waveguide 35a and selection of the column-axis are performed in synchronism with each other in this embodiment, light is produced from intersections (selected points; 35a×36a, 35a×36z) between the selected heating resistors 36a and 36z and the selected optical waveguide 35a. In this manner, in accordance with instruction signals from the information control circuit 30, the optical waveguides 35a, 35b, 35c, . . . , 35z as row-axes and the heating resistors 36a, 36b, . . . , 36z as column-axes are properly selected to provide a two-dimensional display.

The material for the heating resistors as described above may be a metallic compound such as hafnium boride or tantalum nitride, or a transparent conductor such as indium tin oxide (I.T.O.).

Figure 9:
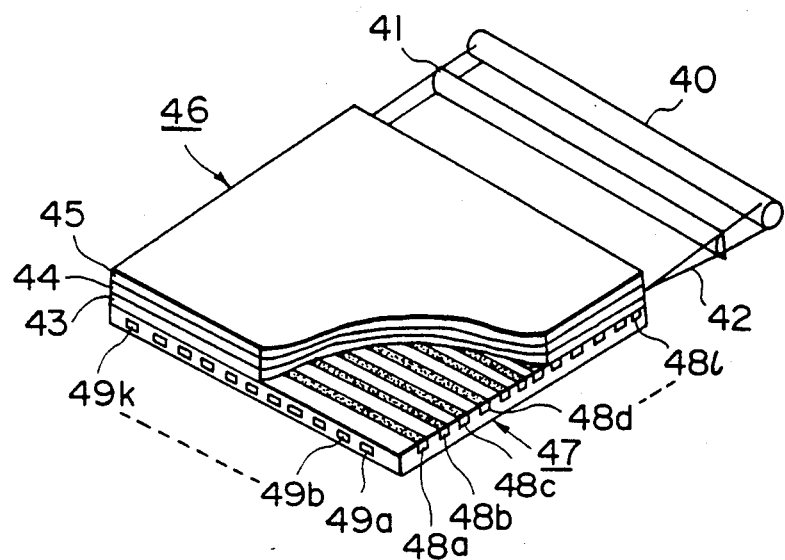
FIG. 9 is a schematic perspective view showing the configuration of a display apparatus as an application of the present invention.

FIG. 9 is a partially exploded schematic perspective view of another light modulation apparatus or display apparatus utilizing the light modulation principle of the optical device shown in FIG. 1.

Figure 10:
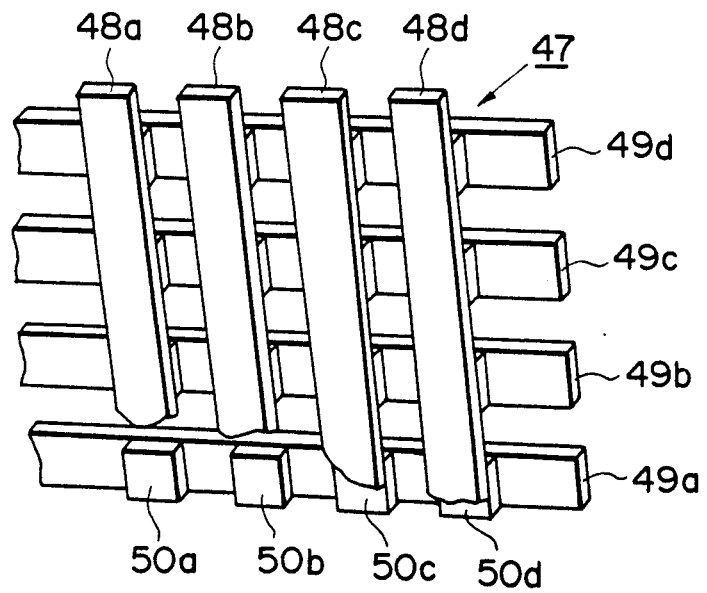
FIG. 10 is a partial, schematic perspective view showing the configuration of a heating means used in the display apparatus shown in FIG. 9.

Referring to FIG. 9, a flat optical waveguide 46 as an optical waveguide panel is constituted of clad layers 43 and 45 comprising flat members having a relatively low refractive index and a core layer 44 which is interposed between the clad layers 43 and 45 and which comprises of a liquid or the like having a relatively high refractive index, as described with reference to FIG. 1. The section of the flat optical waveguide 46 is the same as that shown in FIGS. 1 and 2A except for the heating device used. An illuminating light flux 42 from a linear light source 40 is converged through a cylindrical lens 41 and becomes incident upon one end of the core layer 44. A heating device 47 has a configuration as shown in detail in FIG. 10. Column lines 48a, 48b, 48c, . . . , 48l (hereinafter referred to as the column lines 48) and row lines 49a, 49b, . . . , 49k (hereinafter referred to as the row lines 49) comprise metal films having good electrical conductivity. Resistance materials for heating, to be referred to as heating resistors, are arranged at the intersections of the column lines 48a, 48b, 48c, . . . , 48l and the row lines 49a, 49b, . . . , 49k. FIG. 10 is a partially exploded perspective view of the heating device 47, showing the row lines 49a, 49b, 49c and 49d, and the column lines 48a, 48b, 48c and 48d. The row lines 49 and column lines 48 cross perpendicularly, and the heating resistors are arranged at the intersections thereof. For example, heating resistors 50a, 50b, 50c and 50d (hereinafter referred to as heating resistors 50) are arranged at the intersections of the row line 49a and the column lines 48a, 48b, 48c and 48d. A nonconductive film such as an $SiO_2$ film or the like (not shown) is formed on non-intersecting portions of the row lines 49 and the column lines 48, i.e., portions having no heating resistor 50 arranged therebetween.

The operation mode of the light modulation apparatus or display apparatus according to the present invention will now be described with reference to FIGS. 9 and 10. The illuminating light flux 42 from the linear light source 40 becomes incident upon one end of the core layer 44 of the flat optical waveguide 46 through the cylindrical lens 41. When the core layer 44 is not heated by the heating device 47, light is produced from the other end of the core layer 44 after propagating through the core layer 44 in accordance with the principle described with reference to FIG. 1. If it is assumed that a suitable row line is selected from the row lines 49 and a suitable column line is selected from the column lines 48, the heating resistor at the intersection of these selected lines is energized. Assume that the row line 49a and the column lines 48b and 48d are selected, and a voltage is applied thereacross. Then, the heating resistors 50b and 50d at the intersections of the row line 49a and the column lines 48b and 48d are energized. The heat generated by the heating resistors 50b and 50d is conducted to parts of the core layer 44 through the clad layer 43 above the resistors 50b and 50d. Thus, two parts of the core layer 44 are heated by the heating resistors 50b and 50d, respectively, and heated regions (not shown) as shown in FIG. 1 are formed. Of the illuminating light flux 42 which propagates through the core layer 44, the path of at least part of it is disturbed by the heated regions as described with reference to FIG. 1, such that it is produced as output light (display light) outside the flat optical waveguide 46 through the clad layer 45. A two-dimensional display can be performed by proper selection of the row and column lines 49 and 48 in this manner. The circuit for driving the light modulation apparatus or display apparatus as described above has a configuration as described below. Referring to the apparatus shown in FIG. 8, the light-emitting diodes 34a, 34b, 34c, ..., 34z, the optical waveguides 35a, 35b, 35c, ..., 35z, and the heating resistors 36a, 36b, 36c, ..., 36z are removed; the row lines 49 shown in FIG. 9 are respectively connected to the row-axis drivers 34A, 4B, 34C, ..., 34Z; and the column lines 48 as shown in FIG. 9 are respectively connected to the column-axis drivers 33A, 33B, 33C, ..., 33Z. This display apparatus shown in FIG. 9 operates in the same manner as that described with reference to FIG. 8.

A heating device may alternatively be used wherein heating resistors replace the row and column lines 49 and 48 in FIG. 10, and a thermally conductive and electrically insulating member replaces each heating resistor 50. In this case, portions of the heating resistors where the row- and column-axes cross each other are particularly heated, so that high-temperature heated regions as shown in FIG. 1 are formed on the portions of the core layer corresponding to these heated portions. In those portions of the core layer heated by the remaining portions of the heating resistors which do not intersect each other, such heated regions formed do not reach a sufficiently high temperature to produce output light (display light) as shown in FIG. 1, and therefore the display is not disturbed.

FIG. 11 is a schematic perspective view of modulation apparatus or a display apparatus which utilizes the light modulation principle of the optical device shown in FIG. 4. Referring to FIG. 11, a flat optical waveguide 58 as a light modulation device or a display device has a similar configuration in section to that shown in FIG. 4. The optical waveguide 58 is constituted of an infrared ray absorption layer 54, a thermally conductive clad layer 55 comprising a flat member of a relatively low refractive index, a core layer 56 comprising a liquid or the like of a relatively high refractive index, and a transparent clad layer 57 comprising a flat member of a relatively low refractive index. These layers are stacked in the order named. That part of the flat optical waveguide 58 which excludes the infrared ray absorption layer 54 is called an optical waveguide panel. An illuminating light flux 53 from a linear light source 51 is converged by a cylindrical lens 52 and is guided to the core layer 56 of the flat optical waveguide 58. An infrared ray beam 62 is radiated from a radiation generating means (e.g., a radiation-generating means comprising a laser-generating device or the like). The infrared ray beam 62 is two-dimensionally scanned along a track 61 on the infrared ray absorption layer 54 of the flat optical waveguide 58. The infrared ray beam 62 is modulated by a video information signal. A numeral 59 refers to a heated region which is at a relatively high temperature (however, in the case where the core layer 1 is constituted of a liquid, it is only heated to a temperature below the boiling point). The heated region 59 is formed when the portion of the infrared ray absorption layer 54 radiated with the infrared ray beam 62 generates heat, and the generated heat is conducted to a portion of the core layer 56 through the clad layer 55. Of the illuminating light flux 53 which propagates through the core layer 56 and reaches the heated region 59, at least part of it is produced as output light 60 (display light) outside the optical waveguide 58 through the clad layer 57.

The mode of operation of the display apparatus or light modulation apparatus as shown in FIG. 11 will now be described. The illuminating light flux 53 from the linear light source 51 is converged by the cylindrical lens 52 and becomes incident upon one end of the core layer 56 of the optical waveguide 58. When the infrared ray beam 62 is not irradiated onto the infrared ray absorption layer 54 and the heated region 59 is not formed in the core layer 56, the illuminating light flux 53 incident upon one end of the core layer 56 is totally reflected at the interfaces between the core layer 56 and the clad layers 55 and 57 due to the difference in the refractive indices, and thus propagates through the core layer 56 of the optical waveguide 58 to reach the other end of the core layer 56. In this state, the modulated infrared ray beam 62 is irradiated onto the lower surface of the infrared ray absorption layer 54 along the track 61. Assume that the infrared ray beam 62 is irradiated onto the infrared ray absorption layer 54 along the track 61. The infrared ray absorption layer 54 is heated, and the heat is conducted to the core layer 56 through the clad layer 55 to heat a part of the core layer 56. Then, the heated region 59 of a relatively high temperature and of changed refractive index is formed in the core layer 56, as described with reference to FIG. 4. When a portion of the illuminating light flux 53 propagating through the core layer 56 reaches the heated region 59, the path of such light is disturbed by the heated region 59 in the manner described with reference to FIG. 4. At least a portion of the light whose path is disturbed is produced as the output light (display light) 60 outside the flat optical waveguide 58 through the clad layer 57, as described with reference to FIG. 4. When the infrared ray beam 62 is no longer irradiated onto the portion of the infrared ray absorption layer 54 corresponding to the heated region 59 formed in the core layer 56 and the supply of heat is thus stopped, the heated region 59 is naturally or forcibly cooled, and disappears. Thus, no output light 60 as display light is produced through the clad layer 57. In this manner, a number of heated regions are formed in the core layer in accordance with the light modulation of the infrared ray beam 62, and a two-dimensional display is provided using the flat optical waveguide 58 as one frame.

When the core layer 44 or 56 in the display apparatus shown in FIG. 9 or 11 is a transparent glass plate, the clad layers 43 and 45 in FIG. 9 or the clad layers 55 and 57 in FIG. 11 may be air. In this case, the heating device shown in FIG. 9 or 11 is arranged near the core layer 44 or 56.

In order to improve the optical waveguide efficiency, the flat optical waveguide 58 can be replaced by a transverse dense array of cylindrical optical waveguides as shown in FIGS. 2A, 5 and 6 with a different heating device, or by optical waveguide channels as shown in FIG. 7.

FIG. 12 is a perspective view of one embodiment of a scanning mechanism for scanning or deflecting an infrared ray beam in the apparatus shown in FIG. 11.

Referring to FIG. 12, an infrared ray beam 67 from a laser-generating device as a laser light source is passed through a thin-film waveguide type deflector 64 and a lens 65 and is reflected by a galvanomirror 66. The infrared ray beam 67 scans at high speed an infrared ray absorption layer 69 of a light modulation device or a display device 68 which corresponds to the infrared ray absorption layer 54 of the flat optical waveguide 58 shown in FIG. 11. The galvanomirror 66 is for scanning the light in the direction indicated by arrow a, and the deflector 64 is for scanning the light in the direction indicated by arrow b. One of the galvanomirror 66 and the deflector 64 serves as a horizontal scanner, and the other serves as a vertical scanner.

A two-dimensional scanning mechanism comprising a combination of a galvanomirror and a polygon or the like may also be used.

Figure 13:
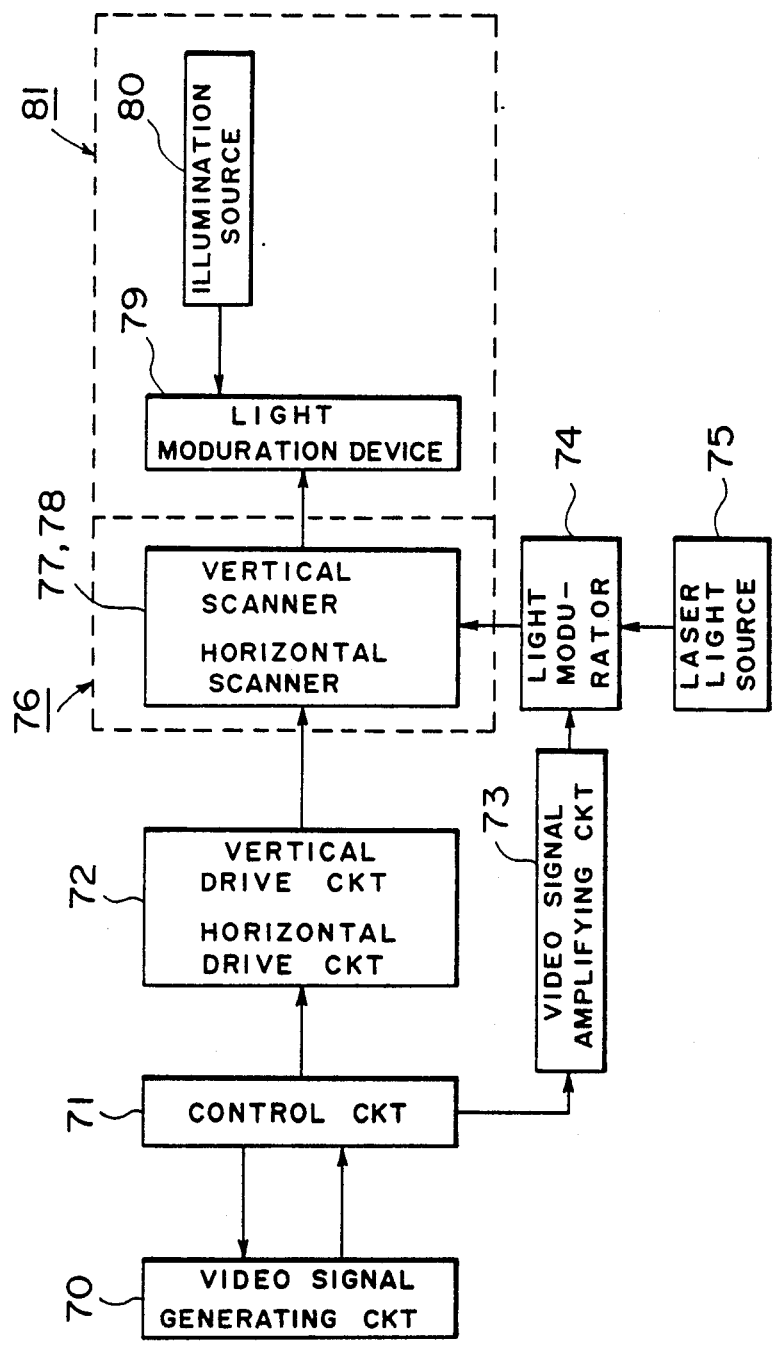
FIG. 13 is a block diagram of a display apparatus as an application of the present invention.

FIG. 13 is a block diagram of a light modulation apparatus or a display apparatus as a whole as an application of the present invention, in particular, a light modulation apparatus using a modulated infrared ray beam.

A video signal generating circuit 70 generates a video signal. A control circuit 71 controls the video signal and supplies it to a video signal amplifying circuit 73 and horizontal and vertical drive circuit units 72. A light modulator 74 modulates an infrared ray beam from a laser light source 75 in accordance with a signal from the video signal amplifying circuit 73. Light modulated by the light modulator 74 becomes incident upon a horizontal scanner 78 or a vertical scanner 77. The horizontal and vertical scanners 78 and 77 operate in response to drive signals synchronous with the video signal from the horizontal and vertical drive circuit unit 72. The infrared ray beam from the scanner becomes incident upon the infrared ray absorption layer of a light modulation device (display device) 79. Light from an illumination source 80 is incident upon one end of the core layer of the light modulation device (display device) 79. An example of the configuration of the scanning mechanism 76 is partially shown in FIG. 12, and an example of the configuration of a light modulation apparatus (display apparatus) 81 is shown in FIG. 11.

A video signal from the video signal generating circuit 70 is amplified by the video signal amplifying circuit 73 through the control circuit 71. In response to an amplified video signal, the light modulator 74 is driven to modulate the infrared ray beam produced from the laser light source 75. Horizontal and vertical synchronous signals are produced from the control circuit 71 to drive the horizontal and vertical scanners 78 and 77 through the horizontal and vertical drive circuit unit 72. In this manner, a thermal two-dimensional image comprising heated regions is formed in the core layer of the light modulation device 79. The subsequent operation of the light modulation apparatus 81 is as has been described with reference to FIG. 11 and will not be repeated here. When a TV wave is to be received, a TV receiver is used in place of the video signal generating circuit 70.

Figure 14:
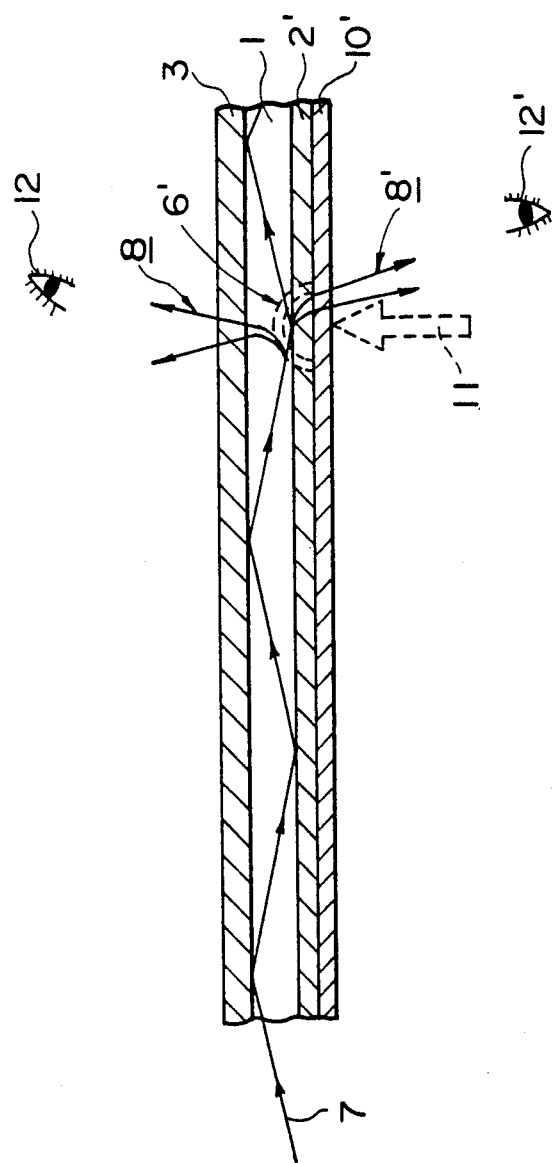
FIG. 14 is a schematic sectional view for explaining still another principle of operation of an optical device according to the present invention as a light modulation device or display device.

FIG. 14 is a partial longitudinal sectional view of an optical device for describing another mode of operation of an optical device according to the present invention.

Referring to FIG. 14, transparent clad layers 2' and 3 are formed on respective surfaces of a core layer 1. An infrared ray absorption layer 10' capable of transmitting visible light is formed below the clad layer 2'. Incident light 7 within a visible light range is incident upon one end of the core layer 1 to propagate therethrough. The above parts remain substantially the same as those described with reference to FIG. 4 except for refractive indices and transparency. In this embodiment, a material of the core layer 1 has a negative change in refractive index with a change in temperature. A material of the clad layer 2' has a positive change in refractive index with a change in temperature. An observer 12 is located at the side of the clad layer 3, an observer 12' is located at the side of the clad layer 2', and an infrared ray beam 11 is incident upon the side of the clad layer 2'. A heated region 6' is formed partly in the clad layer 2' and partly in the core layer 1. The heated region portion in the core layer 1 has a refractive index which gradually decreases toward its center which is at a higher temperature. The heated region portion in the clad layer 2' has a refractive index which gradually increases toward its center which is at a higher temperature. Output light 8 is produced from the core layer 1 through the clad layer 3. Output light 8' is produced from the core layer 1 through the clad layer 2' and the infrared ray absorption layer 10'.

When the infrared ray beam 11 is not irradiated onto the infrared ray absorption layer 10', the light 7 propagates through the core layer 1 by repeated total reflection at the interfaces between the core layer 1 and the clad layers 2' and 3. Since almost no light is produced through the clad layer 2' or 3, the observers 12 and 12' perceive substantially no light.

Assume that the infrared ray beam 11 becomes incident upon the infrared ray absorption layer 10'. The portion of the infrared ray absorption layer 10' which is irradiated with the infrared ray beam 11 generates heat. The generated heat is conducted to the clad layer 2' and the core layer 1. The heated region 6' of a relatively high temperature and of a changed refractive index is formed by the heated portions of the core layer 1 and the clad layer 2'. Of the incident light 7, the path of the portion of light which reaches the portion of the heated region in the core layer 1 is disturbed by the heated region 6'. Then, the total reflection condition is disturbed, and the above-mentioned portion of light is produced outside the optical device as the output light 8 through the clad layer 3. The output light 8 can be viewed by the observer 12. The remaining light flux propagates through the heated region in the core layer 1 while being refracted. The angle of refraction is small with respect to the surface of the clad layer 2' so as to obtain a larger angle of incidence. However, the portion of the remaining part of the core layer 1 between the remaining part of the core layer 1 and the clad layer 2' and corresponding to the center of the I heated region 6' has a refractive index lower than the remaining portion of the core layer 1. A similar portion of the clad layer 2' has a refractive index which is higher than that of the remaining portion thereof. Thus, the difference between the refractive indices of these heated region portions of the core layer 1 and the clad layer 2' is considerably reduced, and the critical angle at these portions becomes very large. As a result, part of the light 7 which reaches the interface between the heated region portions of the core layer 1 and the clad layer 2' in the heated region 6' is not totally reflected by the interface due to such a large critical angle. Such part of the light 7 then is produced as the output light 8' outside the optical device through the clad layer 2' and the infrared ray absorption layer 10'. The output light 8' can then be observed by the observer 12'. The remaining light (possibly none) is totally reflected and continues to propagate through the core layer 1. When the materials of the core layer 1 and the clad layer 2' are properly selected, an optical device may be provided by which display can be observed from both surfaces.

An optical device in which the output light is produced to both surfaces can similarly be obtained when the infrared ray absorption layer 10' as the heating device is replaced by a heating resistor as shown in FIG. 1. These optical devices can be applied to light modulation devices or light modulation apparatuses such as display devices or display apparatuses as shown in FIGS. 5 to 13.

The heating device can be incorporated into the optical waveguide panel if the heating resistor or the infrared ray absorption layer of the light modulation apparatus or display apparatus shown in FIGS. 5 to 7 and 9 to 11 is formed within a clad layer of the panel or at the interface between the core layer and the clad layer of the panel. In this case, even if the heating device is arranged at the interface between the core layer and the clad layer, the display can be performed in accordance with the light modulation principle or display principle described with reference to FIGS. 1 to 4 or 14, provided that the total reflection condition between the heating device and the core layer for propagating light therethrough is satisfied.

As has been described in detail above, the main effects obtained according to the present invention are as enumerated below:

(1) Since small core layer heated regions can be arranged at a high density as unit display pixels, a high-resolution image display can be performed.

(2) The optical device has a relatively simple structure, excellent productivity, excellent durability, and high reliability.

(3) The device can be applied to a wide variety of drive methods.

(4) Such a display is not performed by the formation of vapor bubbles but by heating the core layer to a temperature lower than the boiling point thereof, power consumed by the optical device can be reduced to the minimum. Thus, the power source and hence the light modulation apparatus or display apparatus can be rendered compact.

(5) In an optical device which performs light modulation or display using vapor bubbles, the optical device may be damaged by cavitation caused when the bubbles disappear. However, according to the present invention, since the core layer is heated without being boiled, durability of the device is very high.

What is claimed is:

1. An optical apparatus comprising:
   an optical device including an optical waveguide having a liquid core layer of a material with a relatively high refractive index and a clad layer of a material having a relatively low refractive index covering said core layer;
   a heating means for externally heating a predetermined region of said liquid core layer below its boiling point such that the refractive index of said predetermined region is lowered;
   a cooling means for eliminating the lower refractive index of said predetermined region; and
   a light source for supplying light to said optical waveguide.

2. The optical modulation apparatus according to claim 1, wherein said clad layer has a refractive index of less than 1.5.

3. The optical modulation apparatus according to claim 1, wherein said heating means comprises a heat-generating resistor.

4. The optical modulation apparatus according to claim 1, wherein said heating means comprises a plurality of said heat-generating resistors extending longitudinally and arranged such that they intersect a plurality of optical waveguides.

5. The optical modulation apparatus according to claim 4, wherein said light is introduced into said core layer of an optical waveguide selected from said plurality of optical waveguides.

6. The optical modulation apparatus according to claim 5, wherein the light introduced into said core layer is generated by a light emitting diode.

7. The optical modulation apparatus according to claim 5, wherein the light introduced into said core layer is generated by a laser beam.

8. The optical modulation apparatus according to claim 1, wherein said heating means comprises a laser beam.

9. An optical apparatus comprising:
   an optical waveguide panel including a plurality of generally cylindrical optical waveguides, each comprising a core layer of a material having a relatively high refractive index and a clad layer of a material having a relatively low refractive index covering said core layer; a selective heating means for externally heating said optical waveguide to heat said liquid core layer below its boiling point to define a predetermined region where the refractive index thereof is lowered; a light source for introducing light into said core layer; and a cooling means for eliminating the lowered refractive index of said predetermined region.

10. An optical apparatus comprising
    an optical waveguide panel having optical waveguide channels with core layers formed therein by providing a generally transparent liquid having a relatively high refractive index in substantially parallel channels in a combined clad layer of a relatively low refractive index formed by a transparent flat clad layer having stripe-shaped grooves in a surface thereof and a flat clad layer adhered to said transparent clad layer; each channel comprising a selective heating means for externally heating said optical waveguide to heat a predetermined region of said liquid core layer below its boiling point where the refractive index thereof is lowered; a light source for introducing light into said core layer; and a cooling means for eliminating the lowered refractive index of said predetermined region.

* * * * *